United States Patent [19]

Tagawa et al.

[11] Patent Number: 5,519,611
[45] Date of Patent: May 21, 1996

[54] SUSPENSION CONTROL APPARATUS FOR VEHICLE

[75] Inventors: Chikashi Tagawa, Hiroshima; Shin Takehara, Higashihiroshima, both of Japan

[73] Assignees: Naldec Corporation; Mazda Motor Corporation, both of Hiroshima, Japan

[21] Appl. No.: 903,457

[22] Filed: Jun. 24, 1992

[30] Foreign Application Priority Data

Jun. 26, 1991 [JP] Japan .................................... 3-154627

[51] Int. Cl.$^6$ .......................... B60G 17/015; B60G 21/06
[52] U.S. Cl. ...................... 364/424.05; 280/707; 280/840
[58] Field of Search .......................... 364/424.05, 424.01; 280/707, 714, 772, 689, 840, 709, 6.12; 188/322.19, 299, 305, 282; 303/177, 154, 196; 60/585, 415; 180/9.1, 9.52, 22, 41

[56] References Cited

U.S. PATENT DOCUMENTS

| 4,948,164 | 8/1990 | Hano et al. ................................ 280/707 |
| 5,016,908 | 5/1991 | Athanas et al. ...................... 364/424.05 |
| 5,066,041 | 11/1991 | Kindermann et al. .................... 280/772 |
| 5,072,392 | 12/1991 | Taniguchi ............................ 364/424.05 |
| 5,083,811 | 1/1992 | Sato et al. ................................ 280/707 |
| 5,088,762 | 2/1992 | Fukuyama et al. ........................ 280/707 |
| 5,133,574 | 7/1992 | Yamaoka et al. ......................... 280/707 |
| 5,144,558 | 9/1992 | Fukushima et al. ................ 364/424.05 |
| 5,144,559 | 9/1992 | Kamimura et al. ................. 364/424.05 |
| 5,173,857 | 12/1992 | Okuyama et al. .................. 364/424.05 |
| 5,239,471 | 8/1993 | Takahashi .......................... 364/424.05 |
| 5,377,107 | 12/1994 | Shimizu et al. .................... 364/424.05 |

FOREIGN PATENT DOCUMENTS

| 3941909A1 | 6/1990 | Germany . |
| 3943007A1 | 7/1990 | Germany . |
| 63-130418 | 6/1988 | Japan . |

OTHER PUBLICATIONS

German Search Report dated Apr. 26, 1993.

Primary Examiner—Kevin J. Teska
Assistant Examiner—Jacques H. Louis-Jacques

[57] ABSTRACT

A suspension control apparatus for a vehicle having hydraulic cylinders which are arranged respectively between a member of the vehicle side and members of each wheel side. A flow control valve controls the supply/drain of hydraulic fluid to/from an operation chamber of the hydraulic cylinders. The suspension control apparatus includes a lateral acceleration detection device which detects lateral acceleration G of the vehicle. A high-pass filter circuit performs high-pass processing on the lateral acceleration signal G. A rate of change G' of the lateral acceleration G is then calculated by a rate of change calculation unit, and the supply/drain of hydraulic fluid is regulated by a regulating unit which controls a flow control valve based on the rate of change G' of the lateral acceleration G.

6 Claims, 10 Drawing Sheets

SUSPENSION CONTROL APPARATUS FOR VEHICLE

BACKGROUND OF THE INVENTION

1. Field of the Inventory

The present invention relates to a suspension apparatus having hydraulic cylinders which are arranged respectively between a vehicle body and each wheel and a flow control valve which changes the suspension characteristics by controlling a hydraulic fluid for an operation chamber of the hydraulic cylinder.

2. Description of the Related Art

As disclosed in Japanese Kokai No. Sho 63-130418, conventionally, an active suspension apparatus is well known for controlling suspension characteristics. In a conventional active suspension, the suspension characteristics are changed in a manner such that supply/drain of hydraulic fluid for hydraulic cylinders, which are respectively arranged between a vehicle body and each wheel, is controlled according to the driving state of a vehicle, and, that the amount of fluid in the hydraulic cylinder is changed. The conventional active suspension apparatus comprises a flow control valve for controlling supply/drain of the hydraulic fluid for an operation chamber in the hydraulic cylinder, vertical acceleration detection means for detecting an acceleration of a vehicle body in the vertical direction, lateral acceleration detection means for detecting an acceleration of the vehicle body in the lateral direction, longitudinal acceleration detection means for detecting an acceleration of the vehicle body in the longitudinal direction, integration means for integrating a detected signal of the vertical acceleration detection means, and control means for obtaining a control variable for the flow control valve based on output signals of each detection means and of the integration means. The conventional active suspension is set such that, in the case where a vehicle is rolling, a rolling displacement is suppressed in a manner such that the control signal corresponding to the control variable which is obtained by the control means is outputted to the flow control valve and the PID control (Proportional, Integral, and Derivative Control) is performed on the supply/drain amount of the hydraulic fluid for the hydraulic cylinder.

Furthermore, the detected signal of the lateral acceleration which is detected in the lateral acceleration detection means is differentiated and the rate of change is obtained. The suspension characteristics are controlled in the period when a vehicle is in the transit from a straight driving state to a turning state in a manner such that the control variable of the flow control valve is corrected according to the rate of change of the lateral acceleration. In this manner, the response of the rolling control, which suppresses the rolling displacement of the vehicle, is improved.

With the above described arrangement, there is the advantage that, when the vehicle begins turning, a turning state is quickly detected and the rolling displacement is effectively suppressed. However, in the case where the vehicle is in a stable turning state, e.g. a J-turn (a turn in the shape of J), the controller outputs a signal which drains the hydraulic oil from the operation chamber of the hydraulic cylinder resulting in a tendency to decrease the driving stability.

Figure 1A:
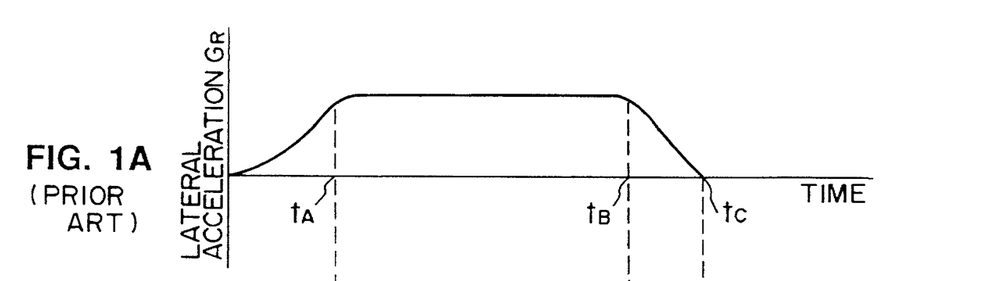
FIG. 1A is a timing chart indicating the actual change of an acceleration G in the lateral direction.
Figure 1B:
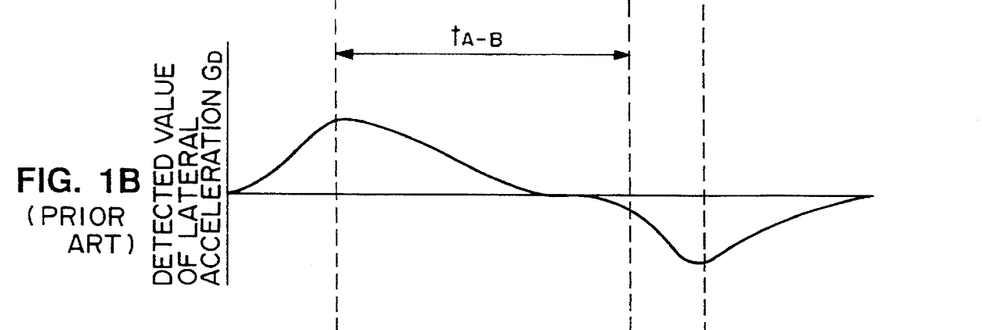
FIG. 1B is a timing chart indicating the change of an acceleration $G_D$ which is detected by the suspension apparatus.

As shown in FIG. 1A, in the J turn, the actual lateral acceleration $G_R$ gradually increases at the beginning according to a steering operation. Then, in the period $t_{A-B}$ when the steering operation becomes almost stable, the actual lateral acceleration $G_R$ is somewhat constant, and later, gradually decreases. In the stable turning period $t_{A-B}$, as shown in FIG. 1B, the detected value of the lateral acceleration $G_D$ which is outputted from the lateral acceleration detection means is gradually decreased. In the stable turning period $t_{A-B}$, the object is to prevent the control signal, which adjusts a height displacement, from being outputted over a long time in response to the output of the lateral acceleration signal including low frequency elements. To attain this object, in the conventional suspension apparatus, the low frequency components of the detected signal $G_D$ of the lateral acceleration are removed by a high-pass filter, therefore, the controller of the suspension apparatus recognizes that the lateral acceleration $G_D$ is gradually decreasing in the stable turning period $t_{A-B}$ as shown in FIG. 1B.

The phenomenon that the detected acceleration signal $G_D$ is gradually decreased even when the actual lateral acceleration $G_r$ is stable occurs in the case where the vehicle is stopped on a slope.

Figure 1C:
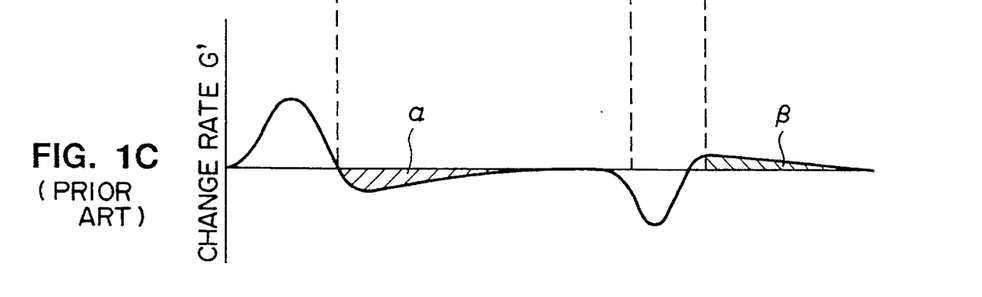
FIG. 1C is a timing chart indicating the change of the rate of change G' of the lateral acceleration.

Therefore, the rate of change of the lateral acceleration G' (=dG/dt) is obtained by the differentiation of the detected value of the lateral acceleration $G_D$ which is necessary for improving a response of the rolling suppression control. As shown in FIG. 1C, a region α where the value G' becomes a negative value according to the decline of the detected value $G_D$ of the lateral acceleration $G_R$ in the stable turning period $t_{A-B}$. In the region α, the controller of the suspension apparatus controls to drain the hydraulic oil from the operation chamber of the hydraulic cylinder resulting in a decrease in the driving stability. Furthermore, as indicated in FIG. 1C at the point $t_c$ where the turn is completed, a region β where the value of the rate of change G' of the lateral acceleration $G_D$ becomes a positive value appears. The region β is originally a region where the rolling control should be suppressed, however, an unnecessary rolling control is executed because the value of the rate of change G' of the lateral acceleration $G_D$ becomes positive, resulting in vehicle instability.

SUMMARY OF THE INVENTION

Accordingly, it is an object of the present invention to provide a suspension apparatus which can quickly and appropriately control a vehicle rolling displacement which is generated in the period during a transition from a straight driving state to a turning state, and prevent a decrease in the driving stability in a stable turning state.

According to the present invention, the foregoing objects are attained by providing a suspension control apparatus for a vehicle having hydraulic cylinders which are arranged respectively between a member of the vehicle frame and members of each wheel side, and a flow control valve which controls supply/drain of a hydraulic fluid from an operation chamber of a hydraulic cylinder, comprising:

- lateral acceleration detection means for detecting a lateral acceleration;
- high-pass filter means for performing high-pass processing on the detected signal of the lateral acceleration means;
- rate of change calculation means for calculating the rate of change of the lateral acceleration; and
- control means for obtaining a control variable for the flow control valve based on the rate of change of the lateral acceleration which is calculated by the rate of change calculation means, the control means having:
- determination means for determining whether or not a vehicle is in a stable turning state; and regulating means for regulating the control of the flow control valve based on the rate of change of the lateral acceleration, in the case where it is confirmed that the vehicle is in a stable turning state by the determination means.

It is another object of the present invention to provide a suspension apparatus which can determine whether or not a vehicle is in a stable turning state, in the case where a control of the flow control valve is regulated.

It is another object of the present invention to provide a suspension apparatus which can simply regulate the control of the flow control valve.

It is another object of the present invention to provide a suspension apparatus which can quickly and appropriately control the rolling displacement which is generated in the transition period and prevent a decrease in driving stability in a stable turning state by a sequential control.

According to the present invention, the foregoing objects are attained by providing a suspension control apparatus for a vehicle having hydraulic cylinders which are arranged respectively between the vehicle frame and members of each wheel side, and a flow control valve which controls supply/ drain of hydraulic fluid for an operation chamber of the hydraulic cylinder, comprising:

- lateral acceleration detection means for detecting a lateral acceleration which affects a vehicle;
- high-pass filter means for performing a high-pass processing on a detected signal of the lateral acceleration means;
- rate of change calculation means for calculating a rate of change of the lateral acceleration;
- adding means for adding a control variable corresponding to the rate of change of the lateral acceleration which is calculated by the rate of change calculation means and a control variable corresponding to the lateral acceleration which is detected by the lateral acceleration detection means; and
- calculation means for calculating a control variable of the flow control valve based on the added value which is calculated by the adding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1A, 1B, and 1C are timing charts for explaining the reason why problems have arisen in the conventional apparatus.

DETAILED DESCRIPTION OF THE INVENTION

The two preferred embodiments of the present invention will now be described in detail in accordance with the accompanying drawings. The suspension apparatus employed in these embodiments has the same construction and the hardware used is the same, but the controlling methods employed in the two embodiments are different from each other. The following two points are common in the two embodiments:

I. Whether or not a vehicle is in a stable turning state or a transition turning state is determined; and II. In the case where it is determined that a vehicle is in the stable turning state, the flow control for a hydraulic cylinder based on the rate of change of a lateral acceleration is regulated.

In the first embodiment, the control is switched from the stable turning state and to the transition state vice versa. On the contrary, in the second embodiment, a signal (which will be referred to as "G+G'" later) expresses both states, and control is sequentially performed without switching.

Constitution of the Suspension Apparatus

Figure 2:
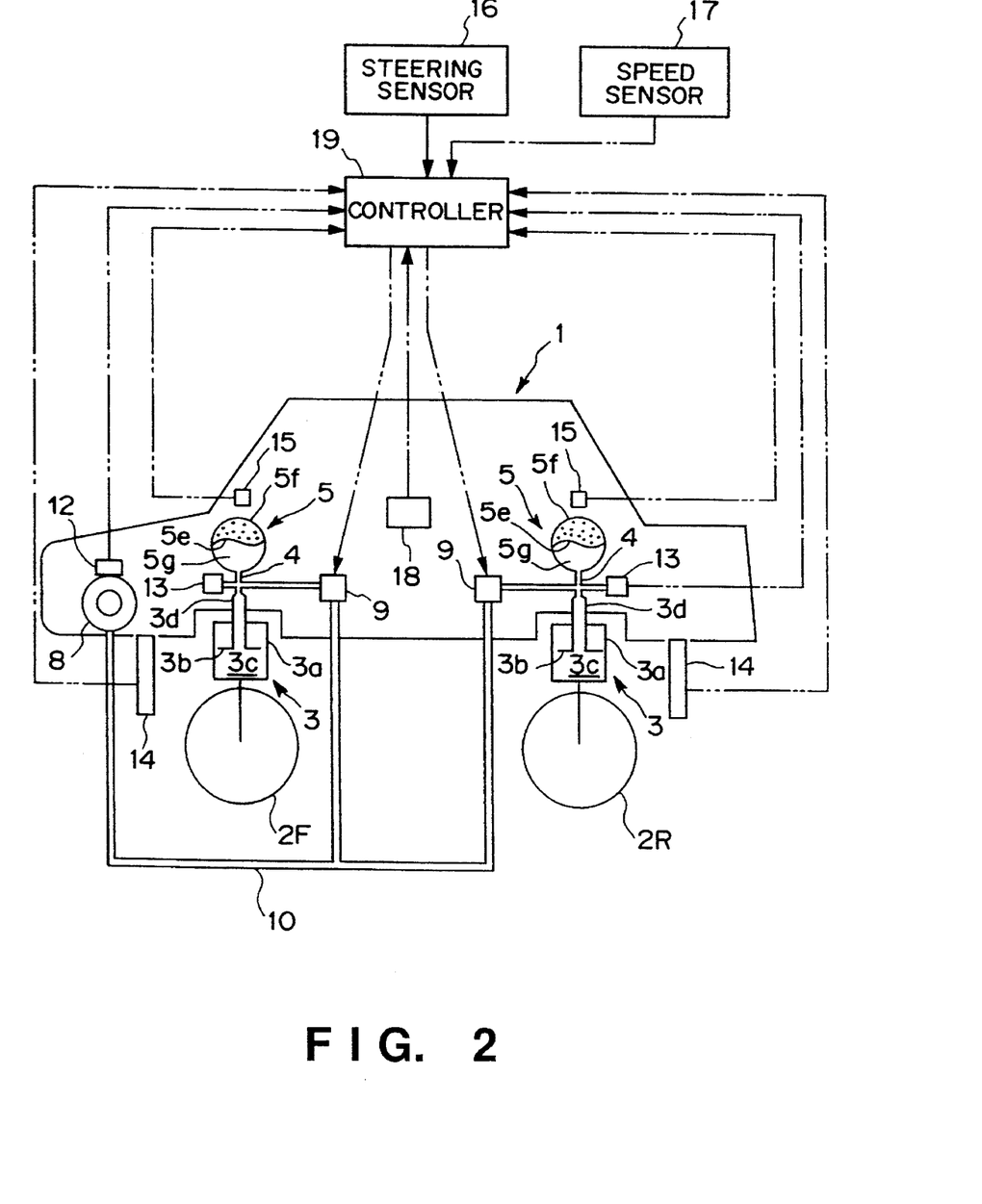
FIG. 2 is a schematic view explaining the suspension apparatus of the vehicle according to present invention.

FIG. 2 shows a schematic view of the suspension apparatus of a vehicle according to the first embodiment of the present invention. Between a vehicle body 1 and a front wheel 2F and a rear wheel 2R, hydraulic cylinders 3 are respectively arranged. The hydraulic cylinder 3 comprises a cylinder body 3a in which the lower part connects to a wheel side member, a piston 3b which is inserted into the cylinder body 3a and forms an operation chamber 3c inside of the cylinder body 3a. On the upper side of the piston 3b, a piston rod 3d in which the upper surface is supported by the vehicle body 1 is arranged. The operation chamber 3c of the hydraulic cylinder 3 connects to a connecting pipe 4 which connects to a gas spring 5. The gas spring 5 is divided into a gas chamber 5f and an operation chamber 5g by a diaphragm 5e. The operation chamber 5g connects to the operation chamber 3 of the hydraulic cylinder 3 through the pipe which is arranged in the connecting pipe 4 and the piston 3b of the cylinder 3.

At the forefront of the vehicle body 1, an oil pump 8 which is driven by an engine (not shown) is arranged, and an oil pipe 10, having a fluid control valve 9, is connected to the oil pump 8. The control valve 9 adjusts the supply of the hydraulic oil to the hydraulic cylinder 3 and controls the draining of the hydraulic oil from the cylinder.

The body 1 further comprises an emission sensor 12 which detects an emission pressure of the oil pump 8, a fluid pressure sensor 13 which detects a fluid pressure in the operation chamber 3c of each hydraulic cylinder 3, a height sensor 14 which detects the displacement of the vehicle's height to each of wheels 2F and 2R, that is, strokes of the cylinder 3, a vertical acceleration sensor 15 which detects an acceleration on the springs of the wheels 2F and 2R, a steering sensor 16 which detects the steering angle of a steering wheel, a vehicle speed sensor 17 which detects a driving speed of the vehicle, and a lateral acceleration sensor 18 which detects a lateral acceleration affecting the vehicle body. The vertical acceleration sensors 15 are respectively placed at both sides of the upper part of the front wheel and between the rear left wheel 2R and the rear right wheel 2R.

The detected signals of the sensors 12–18 are inputted into the controller 19 having a CPU. In the control means, comprising the controller 19, a control variable of the control valve 9 is calculated based on the detected signal. The control signal, corresponding to the control variable, is outputted to the control valve 9 from the controller 19. In this manner, an amount of flow of the hydraulic oil to/from the hydraulic cylinder 3 is controlled and the suspension characteristics are controlled.

Figure 3:
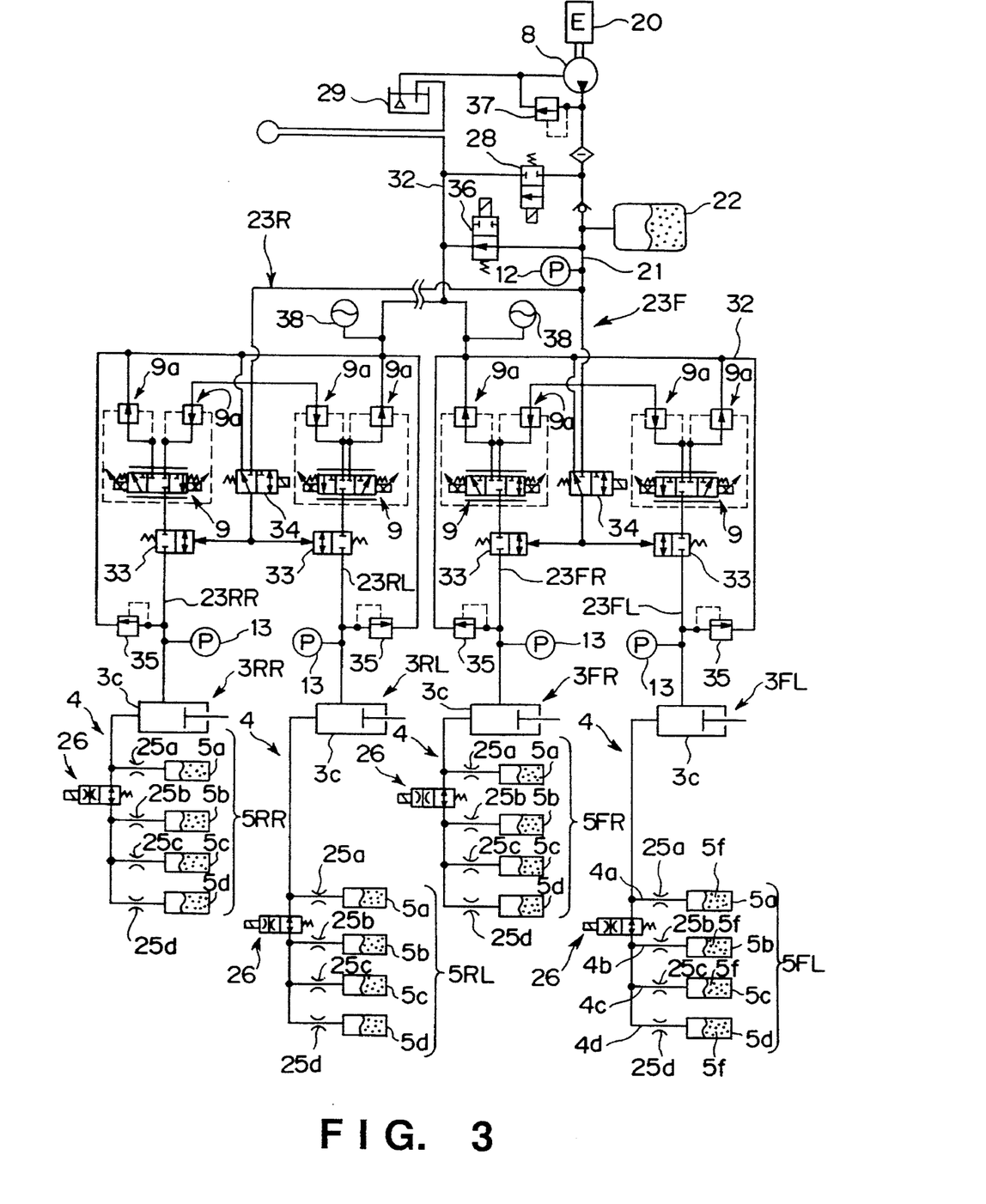
FIG. 3 is a diagram indicating the constitution of the hydraulic oil circuit of the suspension apparatus.

FIG. 3 indicates a hydraulic control circuit which controls supply/drain of the hydraulic oil for the cylinder 3. This hydraulic control circuit comprises an oil pump 8 which is driven by the engine 20. In the emission pipe 21 of the oil pump 8, an accumulator 22 is arranged and the pipe 21 branches into the pipe 23F for the front wheel 2F and the pipe 23R for the rear wheel 2R downstream. The pipe 23F further branches into the pipe 23FL for the front left wheel and the pipe 23FR for the front right wheel. The pipes 23FL and 23FR respectively connect to the operation chambers 3c of the hydraulic cylinders 3FL and 3FR. The pipe 23R further branches into the pipe 23RL for the rear left wheel and the pipe 23RR for the rear right wheel. The pipes 23RL and 23RR respectively connect to the operation chamber 3c of the hydraulic cylinders 3RL and 3RR.

Each of the gas springs 5FL–5RR which are connected to each of the hydraulic cylinders 3FL–3RR, respectively, are comprised four gas spring members 5a, 5b, 5c, and 5d, and these members 5a–5d connect to the connecting pipe 4 through the branch pipes 4a–4d. Furthermore, the orifices 25a–25d are arranged in the connecting pipes 4a–4d. Then, it is set so that the basic functions of the suspension apparatus can be performed by attenuation of the orifices 25a–25d and buffer action of the gas in the gas chamber 5f of each of the gas spring members 5a–5d.

In the connecting pipe 4 which is located between a first gas spring member 5a and a second gas spring member 5d of each of the gas springs 5FL–5RR, damping force switch valve 26, which switches on the damping force by adjusting the passing area, is situated. The damping force switch valve 26 has two positions, a position for opening the connecting pipe 4 and a position capable of adjusting the passing area.

In the emission pipe 21 of the oil pump 8, an unload relief valve 28 is placed near the accumulator 22. The unload relief valve 28 is set so that, in the case when emission pressure of the hydraulic oil, which is detected by the emission pressure sensor 12, is larger than a maximum predetermined value, the closing position is switched to the opening position (not shown) and the hydraulic oil, which is supplied from the oil pump 8, is directly returned to a reserve tank 29, and then accumulated pressure of the hydraulic oil of the accumulator 22 is kept at a predetermined value. In this manner, the supply of the hydraulic oil to each cylinder 3 is performed according to the accumulated pressure of the accumulator 22.

Since the hydraulic control circuit of the cylinder 3 has the same construction in each wheel, only the construction of the hydraulic control circuit for the left front wheel is described. The control valve 9, which is arranged in the pipe 23FL, has three positions: a position for closing the all ports; a position for opening the pipe 23FL to the supply side; and a position for draining the pipe 23FL and the return pipe 32.

The control value 9 further comprises a pair of a pressure compensating valves 9a. The pressure compensating valve 9a is arranged so that the fluid pressure of the hydraulic cylinder 3 is kept at a predetermined value in the case where the control value 9 is at the supply position or the drain position.

In the cylinder 3 side of the control valve 9, a switch valve 33 is arranged which is driven by a pilot pressure which opens or closes the pipe 23FL. The switch valve 33 controls the fluid pressure of a solenoid valve 34 so that, in the case where the solenoid valve 34 which is placed in the pipe 23F connecting to the emission pipe 21 is open, the fluid pressure is inducted as a pilot pressure, and when this pilot pressure is over a predetermined value, the pipe 23FL is opened and the supply/drain of the hydraulic oil is controlled.

In FIG. 3, the numeral 35 is a relief valve which is opened in the case where a pressure of the operation chamber 3c in the cylinder 3 is abnormally high and the hydraulic oil in the operation chamber 3c is returned to the return pipe 32. The numeral 36 is an ignition key interlocking valve which connects to the pipe 21 of the oil pump 8 near the accumulator 22. In the case where the ignition key is off, the ignition key interlocking valve returns the hydraulic oil which is stored in the accumulator 22 to the reserve tank 29, and releases the pressure. The numeral 37 is a relief valve which returns emission oil to the reserve 29 and reduces the pressure in the pump, in the case where an emission pressure of the oil pump 8 is extremely high. The numeral 38 is a return accumulator which is arranged in the return pipe 32 and performs a pressure accumulation in the case where the hydraulic oil is drained from the cylinder 3.

Figure 4:
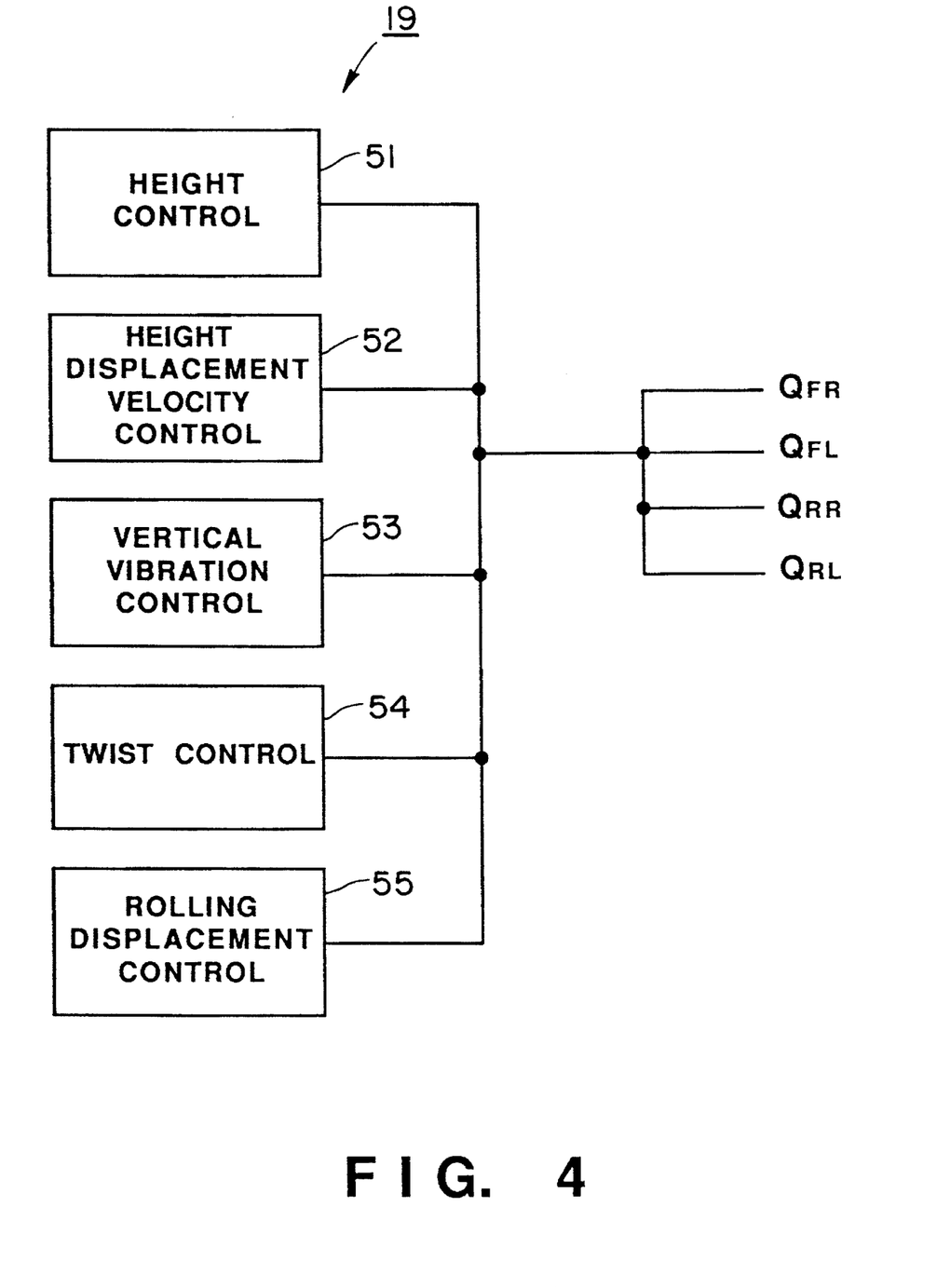
FIG. 4 is a schematic view indicating the constitution of the controller 19 of the suspension apparatus of FIG. 2.

As shown FIG. 4, the controller 19 comprises five control sections. These control sections comprise a vehicle height control section 51 for controlling the height of a vehicle to be an objective height based on the detected signal which is outputted from the height sensor 14; a vehicle height displacement velocity control section 52 for controlling a height displacement velocity based on the height displacement velocity signal which is obtained by differentiating the detected signal of the height; a vertical vibration control section 53 for controlling a vertical vibration of the vehicle based on the detected signal of the vertical acceleration which is outputted from the vertical acceleration sensor 15; a twist control section 54 for controlling the twist of the vehicle based on the detected signal of the operation chamber which is outputted from the fluid pressure sensor 13 in each cylinder 3; and a rolling displacement control section 55 for controlling a rolling displacement of the vehicle based on a rate of change of the lateral acceleration from the detected signal of the lateral acceleration which is outputted from the lateral acceleration sensor 18 and the differentiated value.

The height control section 51, the height displacement velocity control section 52, the vertical vibration control section 53, and the twist control section 54, however, do not directly relate to the present invention. Therefore, a detailed description on these sections is omitted here, but the rolling displacement control section 55, which is the characteristic of the present invention, is described.

Figure 5:
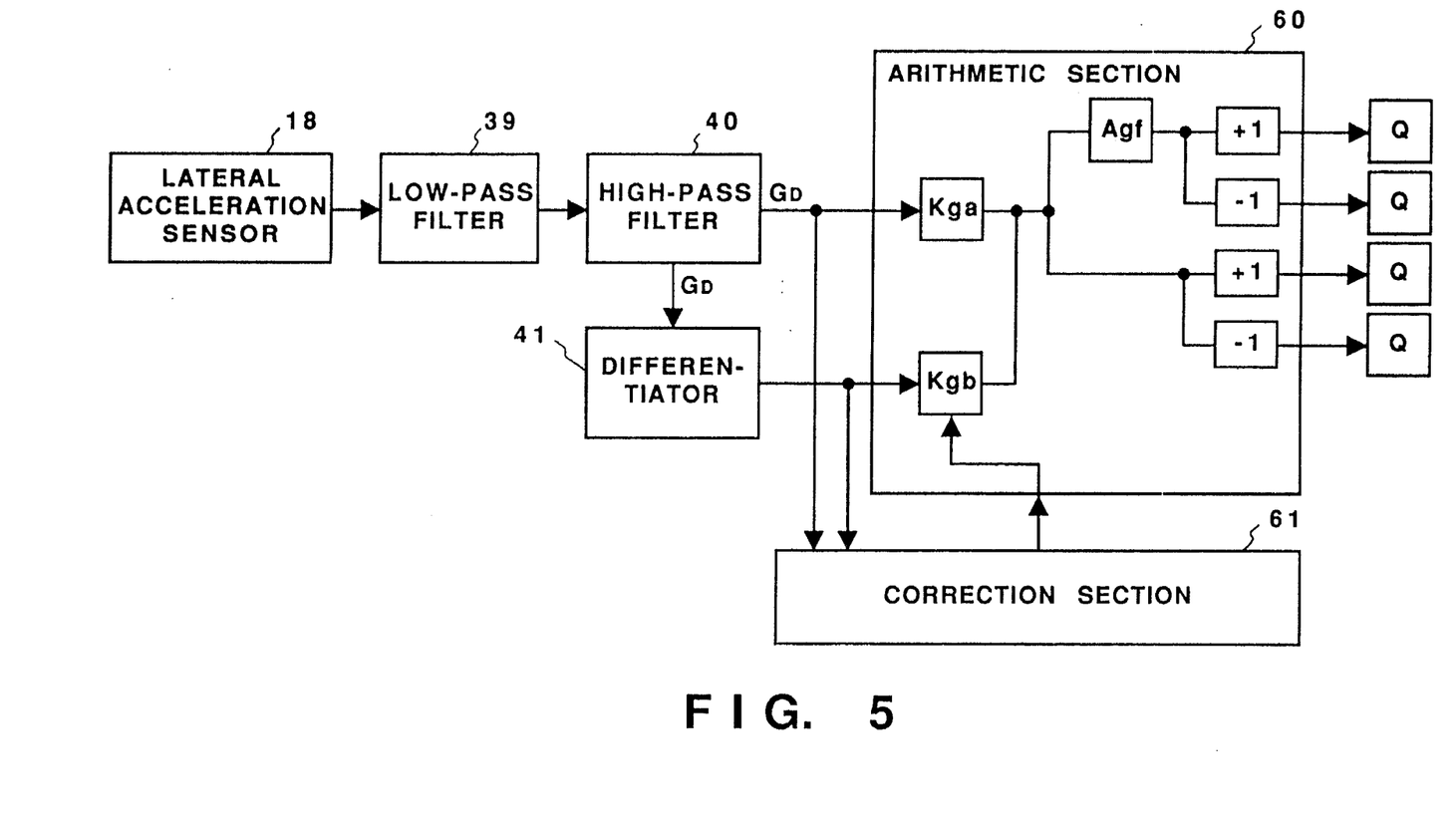
FIGS. 5 and 6 are the block diagrams illustrating the constitution of the rolling displacement control section according to a first embodiment of the present invention.

As shown in FIG. 5, the rolling displacement control section 55 comprises an arithmetic section 60 which calculates control variables Q and a correction section 61 which corrects an operation in the arithmetic section 60. FIG. 5 illustrates the arithmetic section 60 and FIG. 6 illustrates the correction section 61.

Referring to FIG. 5, the arithmetic section 60 comprises a low-pass filter 39 for removing the high frequency elements of the detected signal of the lateral acceleration which is detected by the lateral acceleration sensor 18, a high-pass filter 40 for removing the low frequency elements of the signal which is outputted from the low-pass filter 39, a rate of change calculator 41 (which is referred to as a "differentiator" thereafter) which calculates a differentiated value of the detected signal of the lateral acceleration according to the signal $G_D$ which is outputted from the high-pass filter 40, that is, a rate of change G'. The arithmetic section 60 is such that each control variable Q of the four flow control valves 9 is obtained for each wheel based on the lateral acceleration $G_D$ which is outputted from the high-pass filter 40, the rate of change G' of the lateral acceleration which is obtained in the differentiator 41, the control gain $K_{ga}$ for lateral acceleration, the control gain $K_{gb}$ for rate of change, and the control gain $A_{gf}$ for the front wheels. Since the high-pass filter 40 is arranged to prevent the control signal for adjusting a height displacement from being outputted over a long time, the signal $G_D$ as shown in FIG. 1B is detected by this filter.

Figure 6:
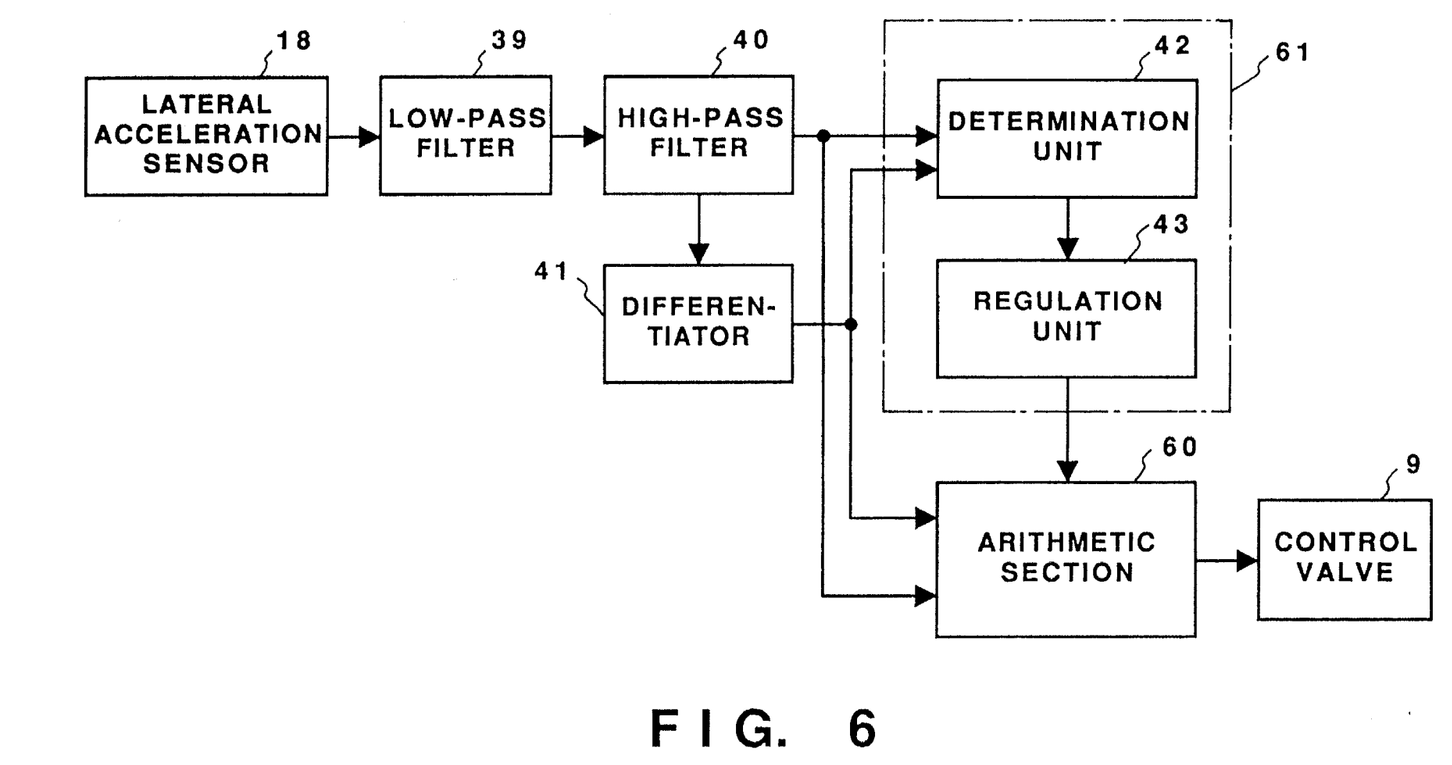

As shown in FIG. 6, the correction section 61 comprises a determination unit 42, which determines whether or not a vehicle is at the stable turning state in the j-turn according to the output signal $G_D$ of the high-pass filter 40 and the output signal which is outputted from the differentiator 41, and a regulation unit 43, which regulates control by the arithmetic section 60 of the flow control valve 9 based on the rate of change of the lateral acceleration in the case where it is assured that the vehicle is in the stable turning state.

The two embodiments of the determination unit 42 and the regulation unit 43 are described below.

First Embodiment

Figure 7:
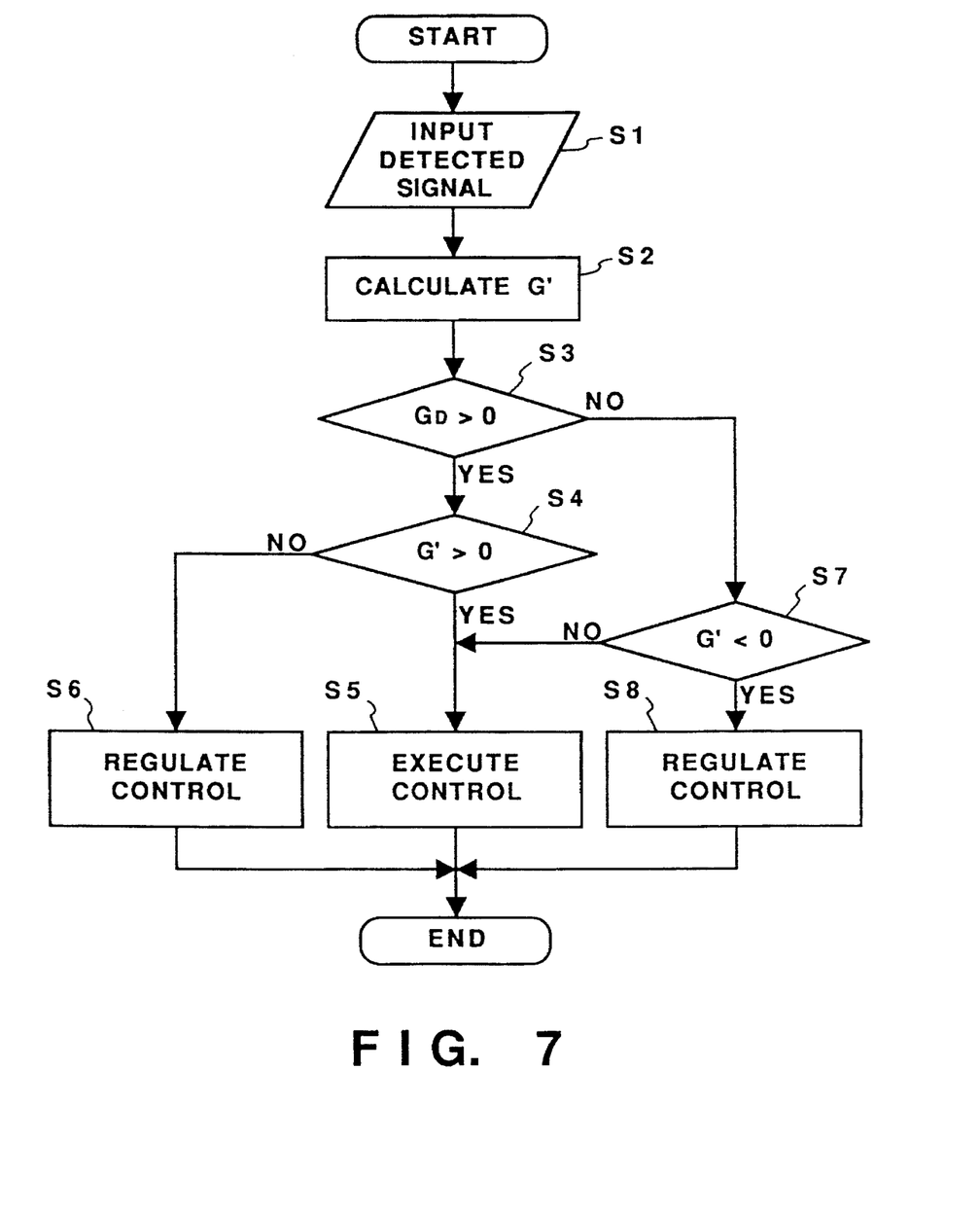
FIG. 7 is a flowchart showing the control operation of the rolling displacement control section.

The control operation which controls the rolling displacement according to the first embodiment is described accompanying the flowchart in FIG. 7.

When the control operation is started, in step S1, the detected signals of each sensor are inputted, and in step S2, the rate of change G' of the lateral acceleration G is calculated according to the detected value of the lateral acceleration sensor 18. That is, the output signal $G_D$ of the high-pass filter 40 is differentiated by the differentiator 41 and the state of the lateral acceleration G which is detected at every unit time is obtained as a rate of change G'.

In step S3, it is determined whether or not the value of the lateral acceleration $G_D$ is larger than 0. That is, whether or not the sign of the value of the lateral acceleration $G_D$ is positive is determined. In step S4, in the case where it is determined as "YES" and the lateral acceleration $G_D$ and the rate of change are both positive values, the control of the flow control valve 9 is executed based on the rate of change G' of the lateral acceleration G in step S5. That is, the control variable is obtained based on the product of the lateral acceleration G which is outputted from the high-pass filter 40 and the control gain $K_{ga}$ and the product of the rate of change G' of the lateral acceleration G which is obtained in the differentiator 41 and the control gain $K_{gb}$. Then, the control signal corresponding to this control variable is outputted to the flow control valve 9 and the PID control is performed.

In the case where the rate of change G' is negative, step S4 returns "NO" and the sign of the lateral acceleration G is positive, but a sign of the rate of change G' is negative, it is determined that the vehicle is at the state of the region α of FIG. 1C. Then, in step S6, the flow control valve 9 based on the rate of change G' is regulated. That is, when the gain $K_{gb}$ corresponding to the rate of change G' of the lateral acceleration G is set to 0 and the control variable is calculated, the control signal corresponding to this control variable is outputted to the flow control valve 9.

In the case where the result of the determination in step S3 is "NO" and a value of the lateral acceleration G is less than or equal to 0, in step S7, whether or not the rate of change G' of the lateral acceleration is less than 0, that is, whether or not a sign of the lateral acceleration G is negative is determined. In the case where it is determined as "YES" in step S7 and both signs of the lateral acceleration G and the rate of change G' are negative, the process proceeds to step S8 where the control of the flow control valve 9 based on the rate of change G' of the lateral acceleration G is regulated in a similar way to step S6.

In the case where it is determined as "NO" in step S7 and a sign of the lateral acceleration G is negative, but a sign of the rate of change G' is positive, it is determined that the vehicle is in the state in the region β of FIG. 1C and the process proceeds to step S5 where the flow control valve 9 based on the rate of change G' of the lateral acceleration G is executed.

The control which is indicated in the flowchart of FIG. 7 is as follows:

$G_D > 0$, $G' > 0 \rightarrow K_{ga}$, $K_{gb}$: active $G_D > 0$, $G' \leq 0 \rightarrow K_{ga}$: active, $K_{gb} = 0$ (inactive)

$G_D \leq 0$, $G' \geq 0 \rightarrow K_{ga}$, $K_{gb}$: active $G_D \leq 0$, $G' < 0 \rightarrow K_{ga}$: active, $K_{gb} = 0$ (inactive)

Thus, the controller 19 of the suspension apparatus according to the present embodiment is constituted so that the rate of change G' of the lateral acceleration $G_D$ which is outputted from the high-pass filter 40 is obtained and the differentiation control of the flow control valve 9 based on the rate of change G' is executed. Therefore, the suspension characteristics are quickly and appropriately controlled according to changes in the transition period when the vehicle is in transit from straight driving to the turning state resulting in elimination of a rolling displacement which is generated in the transit period.

Furthermore, the controller 19 determines whether or not the vehicle is in the stable turning state by comparing the sign of the lateral acceleration $G_D$ with a sign of the rate of change G'. In the case where it is assured that the vehicle is in the stable turning state, it is set so that the control of the flow control valve 9 based on the rate of change G' (that is the gain $K_{gb} = 0$) is regulated. Therefore, in the region α in FIG. 1C, the draining of the hydraulic oil from the operation chamber 3c of the hydraulic cylinder 3 can be prevented when the vehicle is in the turning state, thus overcoming the drawback of the conventional art. Furthermore, in the region β in FIG. 1C, the supplying of the hydraulic oil from the operation chamber 3c of the hydraulic cylinder 3 resulting in unnecessary rolling control can be prevented when the vehicle is in the straight driving state, which is another drawback of the conventional art.

Modification of Regulation of First Embodiment

A modification of the first embodiment will now be described.

The value of the gain $K_{gb}$ which corresponds to the rate of change G' of the lateral acceleration $G_D$ in the first embodiment is not necessary to be set to 0 and the value of the gain $K_{gb}$ for rate of change can be set smaller than a usual value. In this modification, in the case where a control variable is calculated, since the variable is calculated by setting the lateral acceleration G as a center, the ratio of the rate of change G' of the lateral acceleration G decreases and the control of the fluid control valve 9 based on the rate of change G' is regulated.

Modification of Determination of First Embodiment

Figure 8:
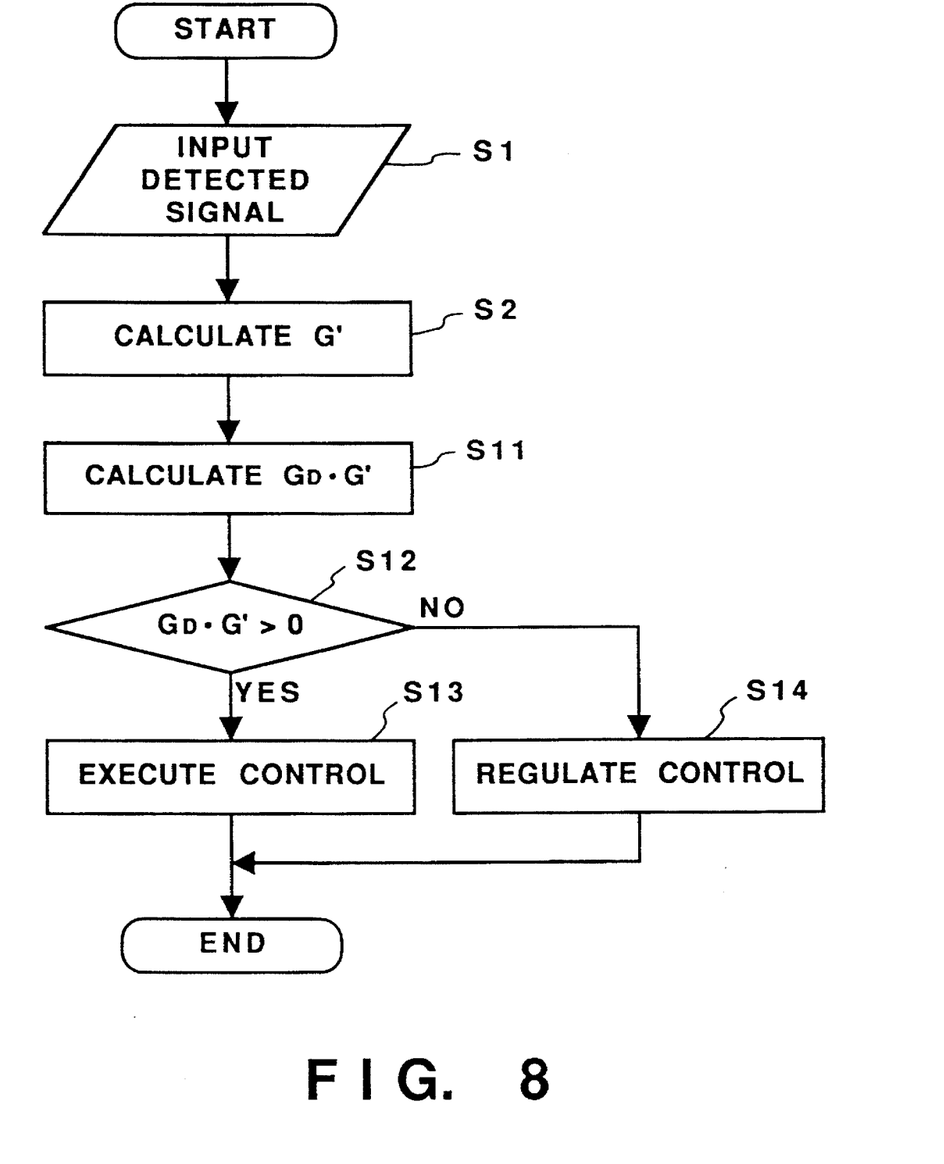
FIG. 8 is a flowchart showing an example of the displacement of the control process of FIG. 7.

In the above embodiment, it is determined whether or not a vehicle is in the stable turning state by comparing a sign of the lateral acceleration $G_D$ with a sign of the rate of change G'. However, as shown in FIG. 8, when a product of the lateral acceleration G and the rate of change G' is obtained in step S11 and whether or not a sign of the lateral acceleration G is the same as that of the rate of change G' of the lateral acceleration G is determined in step S12, whether or not the sign of the product GD·G' is plus or minus is determined. It can then be confirmed whether or not the vehicle is in a stable turning state according to the result of this calculation.

In the case where it is determined "YES" in step S12, the process proceeds to step S13 where an ordinal control which calculates a control variable of the fluid control valve 9 based on the lateral acceleration G and the rate of change G' is executed. In the case where it is determined "NO" in step S12, the process proceeds to step S14 where the control of the fluid control valve 9 based on the rate of change G' is regulated and the rolling displacement control at the stable turning state which calculates a control variable of the fluid control valve 9 is executed using the lateral acceleration G. The process is expressed as follows:

$G_D \cdot G' > 0 \rightarrow K_{ga}$, $K_{gb}$: active $G_D \cdot G' \geq 0 \rightarrow K_{ga}$: active, $K_{gb}=0$ (inactive)

The Second Embodiment

Figure 9:
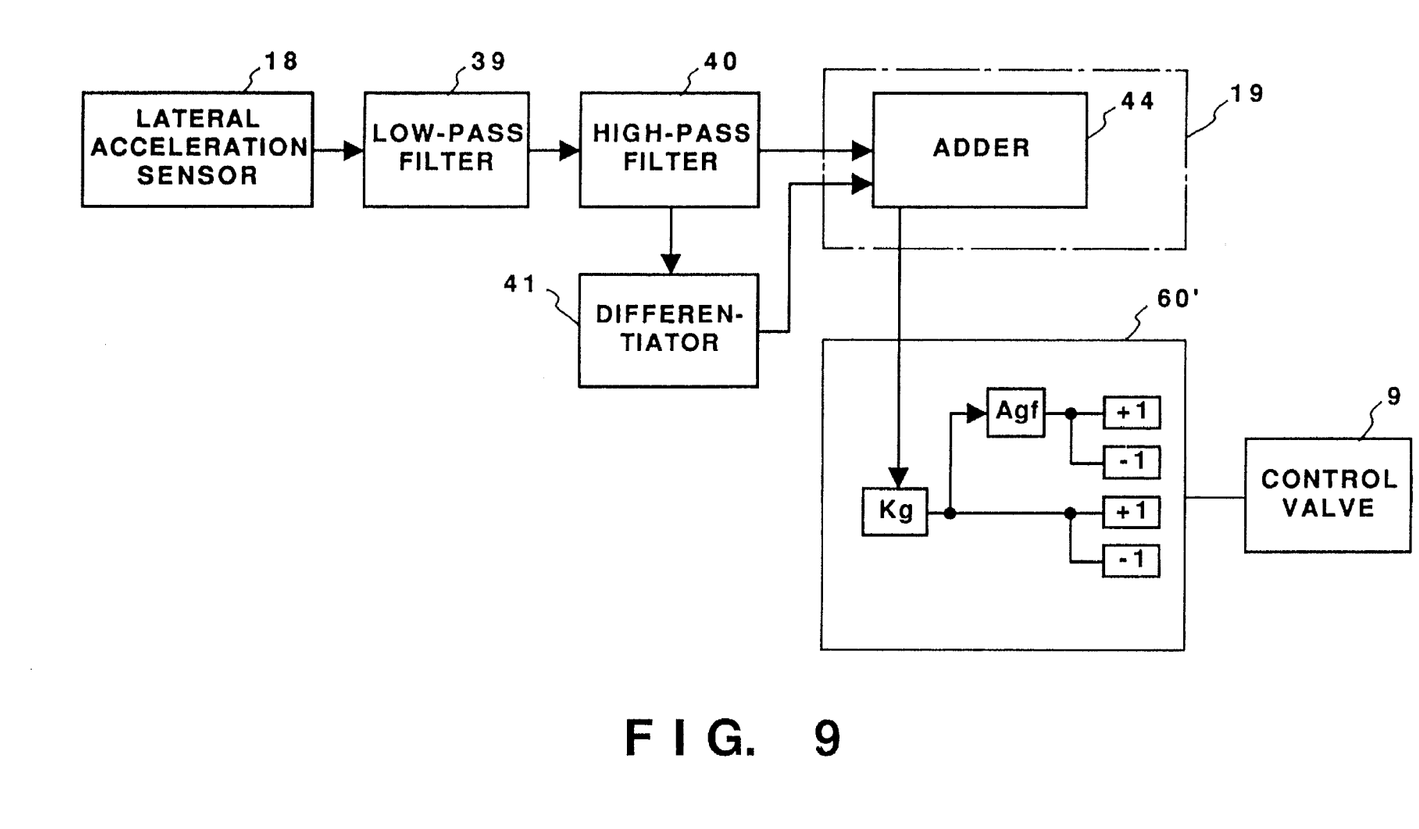
FIG. 9 is a block diagram illustrating a second embodiment according to the present invention.

In the first embodiment, a control is switched when a control is performed by signs of the signal $G_D$ or G'. The second embodiment is constituted so that a switch of control is not performed. FIG. 9 illustrates a block diagram in accordance with the second embodiment.

The controller 19 according to the second embodiment comprises an arithmetic section 60' having a unit $K_g$ in which a gain is changeable instead of having the gain units $K_{ga}$ and $K_{gb}$ according to the first embodiment, and an adder 44 which adds a control variable corresponding to the lateral acceleration $G_D$ which is outputted from the high-pass filter 40 and a control variable corresponding to the rate of change G' of the lateral acceleration $G_D$ which is outputted from the differentiator 41. The controller 19 according to the second embodiment adds the control variables of the lateral acceleration $G_D$ and of the rate of change G' and obtains the added value $G_D+G'$. When the added value $G_D+G'$ is multiplied by the predetermined gain $K_g$ and the control variable of the flow control valve 9 is obtained, the PID control is executed by outputting the control signal corresponding to the control variable to the flow control valve 9.

Figure 10:
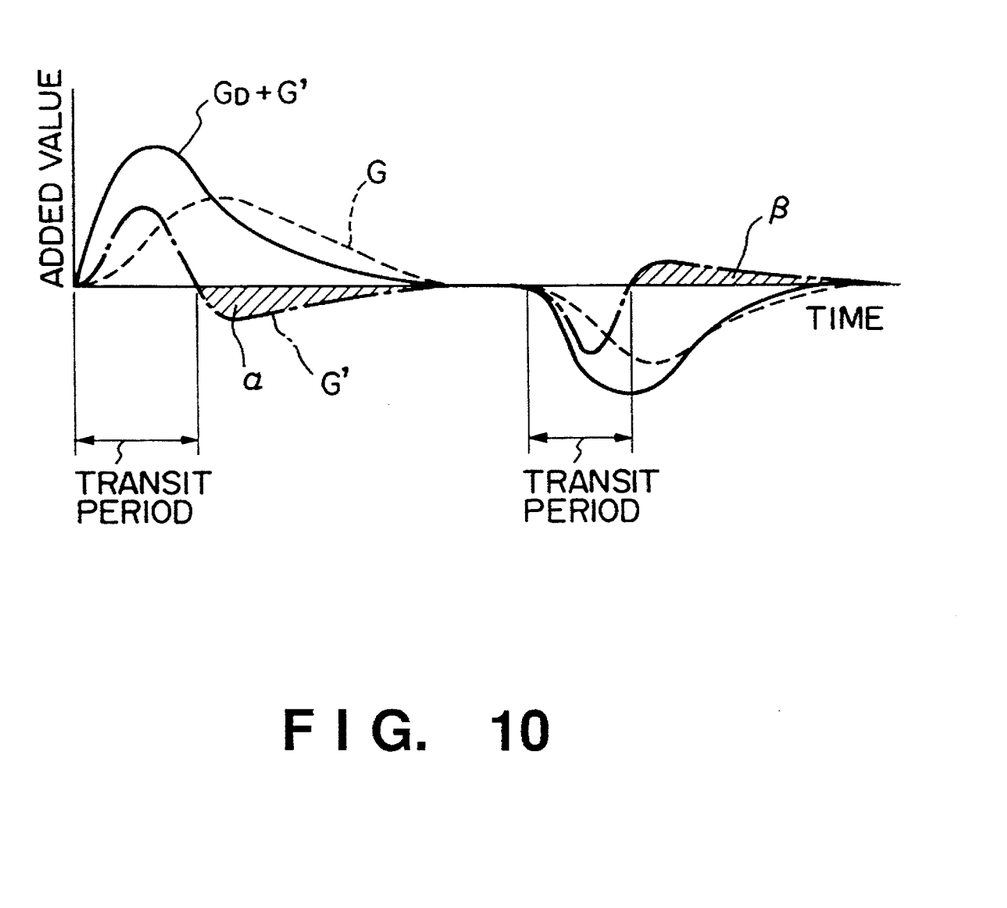
FIG. 10 is a timing chart showing changes of the control variable in accordance with the second embodiment of the present invention.

FIG. 10 shows an example of the transition of the lateral acceleration $G_D$, the rate of change G', and the added value $G_D+G'$. As understood by comparing FIG. 10 with FIG. 1, the signals which indicate that the control is in the transition period are G' and $G_D+G'$ in the point where the vehicle is in the transition from a straight driving state to the turning state or vice versa. However, in the period when the turning state is stable, the signal G' which swings to the minus side (the region α in FIG. 1C or FIG. 10) may stop the roll control which should be performed, while it may perform the roll control which should not be performed when it swings to the plus side (the region β in FIG. 1C or FIG. 10). Therefore, if consecutive control is performed based on a signal without switching a control, only the signal $G_D+G'$ is a signal which assures to control the transmission period between the straight driving state and the turning state.

As many apparently widely different embodiments of the present invention can be made without departing from the spirit and scope thereof, it is to be understood that the invention is not limited to the specific embodiments thereof except as defined in the appended claims.

What is claimed is:

1. A suspension control apparatus for a vehicle having hydraulic cylinders which are arranged respectively between a member of a vehicle frame and members of each wheel, and a flow control valve which controls supply/drain of hydraulic fluid to/from an operation chamber of the hydraulic cylinder, comprising:

lateral acceleration detection means for detecting a lateral acceleration which affects a vehicle;

high-pass filter means for performing a high-pass processing on a detected signal of the lateral acceleration detection means;

rate of change calculation means for calculating a rate of change of the lateral acceleration; and control means for obtaining a control variable for the flow control valve based on the rate of change of the lateral acceleration which is calculated by the rate of change calculation means, the control means having:

determination means for determining whether or not a vehicle is in a stable turning state on the basis of the signal processed by the high-pass filter means; and regulating means for regulating the control of the flow control valve based on the rate of change of the lateral acceleration, when the determination means determines that the vehicle is in the stable turning state.

2. A control apparatus according to claim 1, wherein the determination means determines whether or not the sign of the lateral acceleration detected by the lateral acceleration detection means is same as that of the rate of change of the lateral acceleration calculated by the rate of change calculation means, in the case where the signs are different, it is determined that the vehicle is not in the stable turning state, and the regulating means in response to the determination regulates the control of the flow control valve based on the rate of change of the lateral acceleration.

3. A control apparatus according to claim 1, wherein the control means obtains a control variable of the flow control valve based on the rate of change of the lateral acceleration calculated by the rate of change calculation means in order to control the rolling movement of the vehicle.

4. A control apparatus according to claim 3, wherein the control means comprising means for calculating a control variable of the flow control valve based on the rate of change of the lateral acceleration which is calculated by the rate of change calculation means and a predetermined control gain, the regulating means further includes means for setting the predetermined gain to 0.

5. A suspension control apparatus for a vehicle having hydraulic cylinders which are arranged respectively between a member of a vehicle frame and members of each wheel, and a flow control valve which controls supply/drain of hydraulic fluid to/from an operation chamber of the hydraulic cylinder, comprising:

lateral acceleration detection means for detecting a lateral acceleration which affects a vehicle;

high-pass filter means for performing a high-pass processing on a detected signal of the lateral acceleration detection means;

rate of change calculation means for calculating a rate of change of the lateral acceleration;

adding means for adding a control variable corresponding to the rate of change of the lateral acceleration calculated by the rate of change calculation means and a control variable corresponding to the lateral acceleration detected by the lateral acceleration detection means; and calculation means for calculating a control variable of the flow control valve by applying a predetermined control gain to the added value calculated by the adding means.

6. A control apparatus according to claim 5, wherein the calculation means further includes means for multiplying the added value with the predetermined control gain.

* * * * *